Patented Aug. 26, 1941

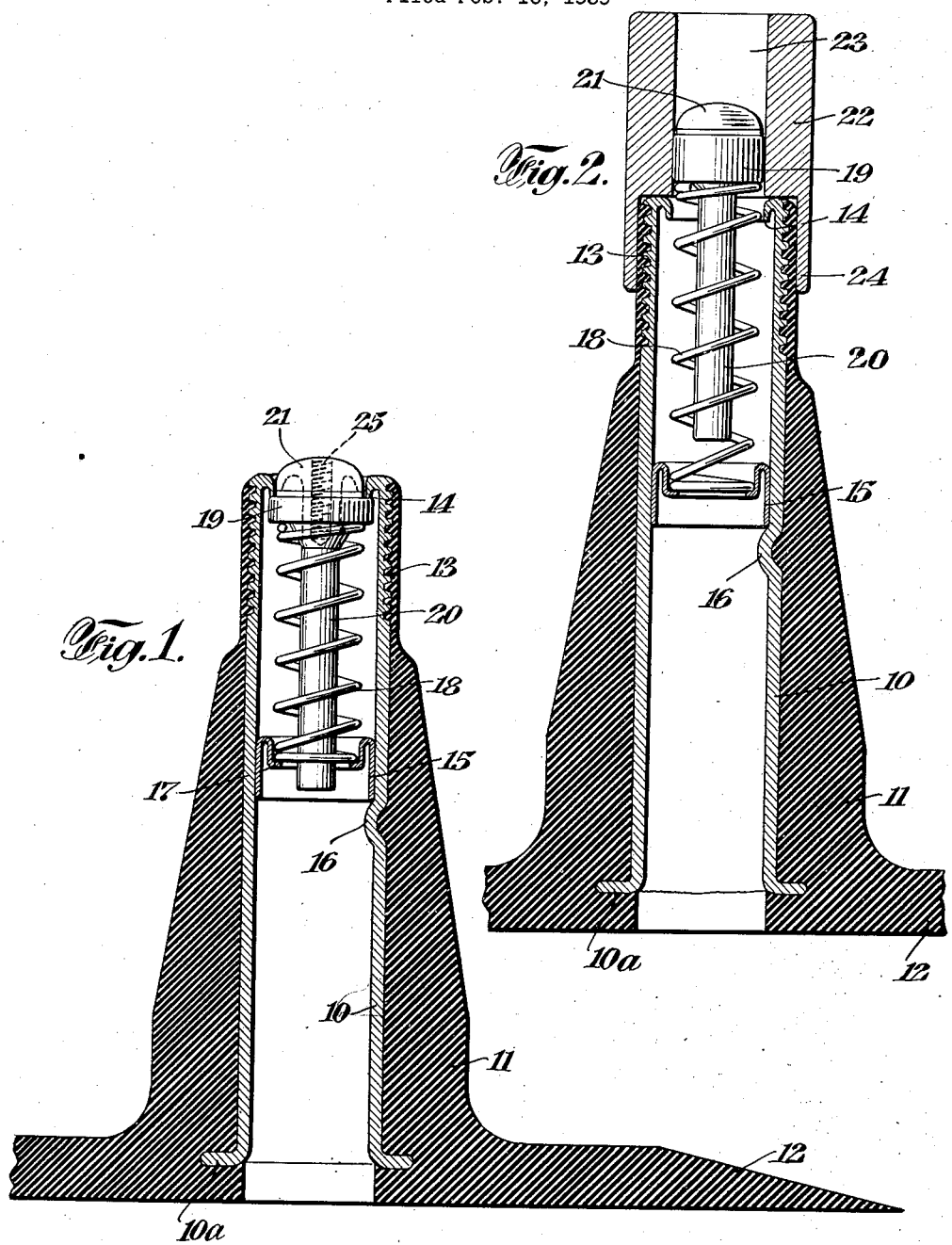

2,254,000

UNITED STATES PATENT OFFICE 2,254,000

VALVE

Lewis C. Broecker, Bridgeport, Conn., assignor to Bridgeport Brass Company, Bridgeport, Conn., a corporation of Connecticut Application February 16, 1939, Serial No. 256,642

3 Claims. (Cl. 251—144)

This invention relates to valves and more especially to air valves for use in connection with pneumatic tires.

An object of this invention is an improved valve structure which eliminates the disadvantages of and objections to the conventional types of valve by providing a valve assembly which is inherently simple, requires no cap, has only one seat or seal and is economical to manufacture.

Other objects, novel features and advantages of this invention will become apparent from the following specification and accompanying drawing, wherein:

Fig. 1 is a longitudinal section through a valve embodying the invention, and

Fig. 2 is a similar section illustrating a stage in the operation of assembling the valve insides in the stem.

A tubular member 10 or metal stem is supported by a stem 11 of yieldable material such, for example, as rubber or rubber composition preferably provided with an integral flap or patch 12 adapted for vulcanization to the exterior surface of a tire tube (not shown). The upper end of the metal stem 10 is preferably provided with threads 13 of the conventional type and form now provided on valve stems. The rubber or other yieldable material of the stem 12 is extended upwardly so as to cover the thread 13.

At the upper end, the stem 10 is provided an inwardly facing valve seat 14 of lesser diameter than that of the bore of the stem 10. The lower end of the stem 10 is provided with an integral flange 10a to assist in securing it firmly to the rubber stem 11. A bushing 15 inserted through the bottom of the stem 10 is held at proper elevation in the stem by inwardly directed offsets 16 formed in the stem 10 after the insertion of the bushing. This bushing may be formed from sheet metal as shown or may be made from bar metal. In either event, the bushing is provided with a recess having an inwardly directed annular flange 17 defining an aperture extending through the bushing.

The lower end of a helical coil spring 18 is supported by the flange 17 and engages the bottom surface of a valve body 19 to urge it into contact with the valve seat 14. A center pin 20 extends through the spring 18 and is provided with a head 21 around which is vulcanized or molded the valve body 19 and is of proper diameter to fit closely but slidably within the bore extending through the valve seat 14.

When an air chuck or gauge is supplied to the stem 10, the head 21 is pushed downward into the stem 10, thus separating the valve body 19 from the valve seat 14 and allowing air to pass freely into or out of the stem. When the air chuck or gauge is removed, the spring 18 immediately engages the valve body 19 with the seat 14, thus sealing the stem. The head 21 being rounded on its outer surface, facilitates its entry into the bore of the valve seat 14 and the center pin 20 being loosely guided inside of the spring 18 serves to keep the upper face of the valve body 19 approximately at right angles with the inner face of the valve seat 14.

In manufacturing so-called rubber valve stems, the rubber stem 11 is vulcanized to the metal stem 10, after insertion therein of the bushing 15. Next, the flange or base 12 is attached to the uncured inner tube by placing it with the tube in the curing or vulcanizing mold and inflating with air or steam at relatively high pressure. When the curing process is completed, the air or steam is allowed to escape and must be entirely removed from the tube before the mold can be opened and the tube removed as the tube will explode or distort when any air under pressure is left inside. The length of time required to introduce and expel air or steam into and out of the inner tube during the curing process is very important and slowness in this respect not only affects the rate of production but causes blistering of the outer surface of the tube. As the area of the smallest air passage through this stem (bore of bushing 15) is nearly twice that of the bore through the stems now in use, the present stem is decidedly superior with respect to rate of introduction or removal of air. After the tube is cured or vulcanized, the core is introduced into the stem 10. The cores now in use have to be screwed into the valve stem. This is a relatively slow operation and occasionally a core will cross-thread resulting in breakage of the core and damage to the valve stem.

The manner of introducing the core of the present invention into the stem 10 is a relatively simple operation and is illustrated in Fig. 2. First, the spring 18 is introduced and its lower end seated on the flange 17 into which position it will readily drop due to the fact that its diameter is slightly less than the diameter of the valve seat 14. An inserting bushing 22 is set in place on the upper end of the stem 10 with its bore 23 in alinement with the bore of the valve seat 14, such alinement being effected by fitting the recess 24 in the bushing 16 over the upper end of the stem 10. The valve body 19, together with the center pin 20, are inserted in the bore 23 and thus are accurately lined up with the spring 18 and bore of the valve seat 14. Next, the valve body and center pin, guided by the bore 23, are pushed into the stem 10, the valve body 19 being sufficiently yieldable to pass through the bore of the valve seat. Immediately after its insertion, the valve body assumes its normal size so as to engage with the valve seat 14. After insertion has been completed, the bushing 22 is removed.

If a valve becomes leaky from any cause, the valve body may be removed by screwing a small threaded rod into the threaded bore 25 in the end of the center pin 20 and applying sufficient pull to remove the valve body and associated center pin. While it is possible to remove the valve body as just described, there is no danger of the valve body being blown out by the air pressure as it would take many times the pressure carried in pneumatic tires to do this, due to the small area of the valve body for air pressure to be exerted against.

The rubber or other yieldable material surrounding the upper end of the stem 10 and covering the thread 13 not only gives a pleasing appearance to the stem by covering the metal of the stem 10, but also makes it possible to use the so-called snap-on air chuck on this stem as the relatively soft yieldable material covering the threads is readily deformable to allow the jaws of the air chuck to enter the threads and thus secure the air chuck as effectively as would be the case if the threads were exposed. The size of the thread 13 is such that a conventional valve cap easily fits the uncovered threads. Thus, should a valve become leaky and a new core not be readily available, a conventional cap can be used in the usual manner by screwing it over the covered threads.

I claim:

1. A valve comprising a tubular stem having an inwardly facing annular valve seat at one end, an annular abutment in said stem, means integral with said stem for supporting said abutment member, a valve body engageable with said seat, a spring interposed between said abutment and valve body, a pin extending through said abutment, spring, and the bore of said valve seat, an annular head on said pin snugly fitting the bore of said valve seat, said valve body being of larger cross-section than said valve seat and being composed of yieldable material capable of sufficient compression to pass through the bore of said valve seat and said pin head being provided with a threaded access.

2. A valve comprising a tubular stem of comparatively large bore having an annular inwardly facing valve seat of lesser diameter than said bore at its upper end, a bushing supported in said stem and provided with a recess and having an inwardly directed flange defining a venting aperture concentric about the axis of said tubular stem and extending through said bushing, said aperture being of sufficient size to permit quick, free venting therethrough, said stem being inwardly offset below said bushing for holding the latter in place in said stem, a valve body engageable with said seat, a spring interposed between said valve body and said flange and extending into said recess in said bushing, a pin extending loosely through said venting aperture in said bushing and said spring, a head on said pin adapted to project into and fit snugly in the bore of said valve seat and having an access opening therein to facilitate removal of said pin, said pin having a diameter substantially smaller than the aperture defined by said flange whereby said spring may urge said valve body into sealing engagement with said seat, said valve body surrounding a portion of said head and being of larger cross section than said valve seat and being composed of yieldable material capable of sufficient compression to pass through the bore of said valve seat.

3. A valve comprising a tubular stem of comparatively large bore having an annular inwardly facing valve seat of lesser diameter than said bore at its upper end, a bushing supported in said stem and provided with a recess, and having an inwardly directed flange defining an aperture extending through said bushing and so admeasured as to permit quick, free introduction and withdrawal of air therethrough, said stem being inwardly offset below said bushing for holding the latter in place in said stem, a valve body engageable with said seat, a spring interposed between said valve body and said flange and extending into said recess in said bushing, a pin extending loosely through said aperture and said spring, a head on said pin adapted to project into and closely but slidably fit said bore of said valve seat, said head being rounded on its outer surface to facilitate its entry into said bore of said valve seat under action of said spring, said valve body surrounding a portion of said head and being of larger cross section than said valve seat and being composed of yieldable material capable of sufficient compression to pass through the bore of said valve seat, and said pin being of substantially smaller diameter than said aperture defined by said flange whereby said spring may seat said valve body on said valve seat.

LEWIS C. BROECKER.